Figure 1:
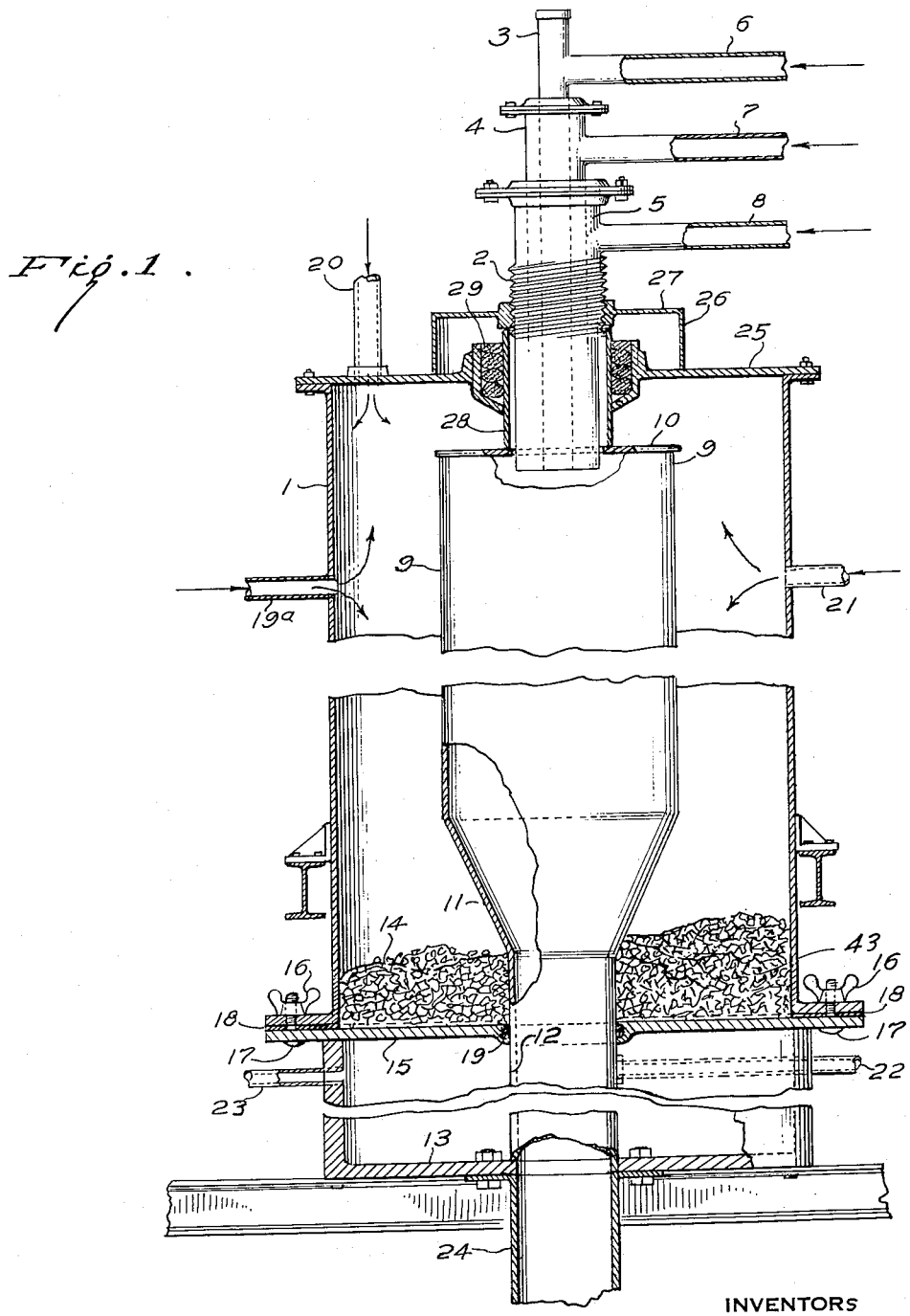

INVENTORS
EARL W. NELSON,
GUY C. MARCOT,
BY
ATTORNEY

United States Patent Office 2,750,260
Patented June 12, 1956

2,750,260

COMBUSTION OF TITANIUM TETRACHLORIDE WITH OXYGEN

Earl W. Nelson and Guy C. Marcot, Lynchburg, Va., assignors to American Cyanamid Company, New York, N. Y., a corporation of Maine Application February 10, 1953, Serial No. 336,092

4 Claims. (Cl. 23—202)

The present invention relates to the manufacture of titanium dioxide pigment by combustion of titanium tetrachloride with oxygen, and apparatus therefor. More particularly, the present invention relates to the combustion of titanium tetrachloride with oxygen under conditions which suppress formation and deposition of titanium dioxide pigment particles on the walls of the reaction chamber and associated apparatus.

In the past, titanium dioxide has been generally manufactured by the sulfation process, according to which a titaniferous material such as ilmenite ore is digested with sulfuric acid to form a titanic sulfate digestion cake. The cake is dissolved in water and the titanium values precipitated by the Blumenfeld hydrolysis method (U. S. Patent No. 1,795,467). The hydrolysate is separated from the mother liquor, which contains the bulk of the impurities, and is calcined. The calciner discharge is titanium dioxide, but the discharge must be subjected to a number of grindings and classifications before it can be termed a pigment. Because the pure white color of titanium dioxide is adversely affected by the presence of even traces of metallic contaminants, the entire process is subjected to many elaborate controls to reduce the amount of these impurities to a minimum.

Concurrently with the development of this process, it was recognized that titanium dioxide could be prepared in a simpler and more direct manner by chlorinating ilmenite ore, recovering the titanium tetrachloride thus produced, purifying the titanium tetrachloride, and burning the titanium tetrachloride in an atmosphere comprising oxygen, the chlorine formed during the combustion being recycled to form more titanium tetrachloride.

In the latter process, the titanium dioxide is produced in a gas-impermeable combustion chamber having two principal zones. In the first or combustion zone, in which the titanium tetrachloride reacts with the oxygen, the reaction takes place at a temperature between about 900° C. and 1600° C. The second zone is the cooling zone, in which the hot gaseous suspension of titanium dioxide particles formed in the first zone is cooled to the point, roughly 600° C., where the particles lose their adhesiveness and their tendency to grow in size. This cooling may be effected by injecting a cold gas or cold volatilizable liquid such as liquid chlorine directly into the hot gaseous suspension. Thereafter, the suspension may be cooled further by indirect means and passed through a cyclone separator and Cottrell precipitator to recover the titanium dioxide. The residual gas is rich in chlorine and is disposed of as desired.

The combustion process was found to present many serious difficulties of its own. A principal difficulty arose from the fact that titanium dioxide pigment particles at combustion temperatures and down to about 600° C. are adhesive and form a smooth adherent satin-like coating (hereinafter termed "plating") of titanium dioxide on the walls of the apparatus. This plating tends to grow indefinitely in thickness as the production of titanium dioxide continues, and in the past has been generally removed by shutting down the apparatus followed by scraping. A further difficulty arose from the fact that formation of titanium dioxide of an undesirable crystalline type took place when the oxidation of titanium tetrachloride occurred on the hot surfaces of the reactor chamber, forming "trees" or "knobs" of titanium dioxide. These formations were also found to grow indefinitely unless removed.

While these difficulties have long been recognized (cf. U. S. Patents 2,240,343 and 2,502,347) no practical method has yet been devised for overcoming them directly which is simple and cheap, which is continuously effective over the length of the combustion operation, and which does not adversely affect the quality of the pigment produced. Despite many prior proposals it is still common to find that titanium dioxide particles, formed within the reaction zone, are carried by the turbulent flow of gases to the wall of the apparatus where they adhere, forming a plating thereon, and that titanium tetrachloride and oxygen react to a small but very significant extent on the walls of the apparatus forming trees or knobs thereon.

The discovery has now been made that when titanium tetrachloride is reacted with oxygen to form titanium dioxide in a combustion chamber having walls of a porous refractory material and a gas (hereinafter termed the purge gas) is passed transversely through the porous walls into the chamber as described below, formation of the smooth satin-like plating of titanium dioxide is substantially prevented and development of trees and knobs much reduced, without any impairment in the quality of the pigment formed in the apparatus.

In a preferred embodiment of the invention, the porous walls of the apparatus are surrounded by a gas-tight jacket made of steel which fits loosely around the porous refractory and the purge gas is admitted at a slight pressure into the space between the jacket and the porous refractory. The differential causes slow diffusion of the purge gas through the porous refractory into the chamber. In another embodiment of the invention, the pressure differential is produced by a fan pump or other evacuating means is connected in series with the cooling zone.

Plating in both the combustion zone and the cooling zone is usually substantially prevented in the manufacture of titanium dioxide when the flow of purge gas is at the extremely low rate of roughly 0.2–2.0 cubic feet of gas (N. T. P.) per minute per square foot of refractory surface.

From the foregoing, it will be apparent that broadly the present invention constitutes a process for reducing the tendency of titanium dioxide pigment particles to plate when such particles are conveyed in gaseous suspension through a conduit at temperatures above about 600° C., which comprises passing the hot gaseous suspension of titanium dioxide through a conduit defined by walls of porous refractory material and continuously passing a gas transversely through the walls into the gaseous suspension.

It is a particular advantage of the present invention that the amount of purge gas needed is very small, so that no substantial change need be made in heretofore known methods of manufacturing titanium dioxide by the combustion process. Calculations show that when a gaseous suspension is passed through a cylindrical conduit of porous refractory material ten feet long and ten inches in diameter at the typical velocity of 3 m./sec. and the purge gas is passed through the walls of the conduit at the rate of 0.6 cubic feet of gas (N. T. P.) per square foot of wall surface per minute, the amount of gas in the gaseous suspension will have increased by only about 5%.

The reaction of titanium tetrachloride with oxygen, while exothermic, is only slightly so and it is therefore usual to provide additional heat, for example by preheating the oxygen and titanium tetrachloride, by adding a hot inert gas such as nitrogen, or by the use of an auxiliary carbon monoxide-oxygen flame. From the point of view of preventing plating and reducing the formation of trees, the action of the purge gas is substantially the same, whether it is supplied to the porous walls at combustion or at room temperature, and therefore the temperature at which the purge gas is supplied is not critical and may be varied in accordance with the thermal requirements of the combustion process viewed as a whole.

As purge gases for use in the combustion zone, in the first instance may be used carbon dioxide, chlorine, the noble gases and nitrogen. These gases are essentially inert in the reaction and do not noticeably modify the characteristics of the pigments produced.

The purging effect exerted by these inert gases is primarily due to their sweeping action. It is believed that permeating through the walls and in diffusing into the combustion zone therefrom they form an inwardly moving barrier or cushion of gas which repels titanium dioxide pigment particles being carried by the turbulent flow of gases towards the walls. The effect of the aforementioned gases is therefore primarily a physical one. They have proved very effective in preventing plating, and when admitted in sufficient volume to form a non-reactive layer of gas adjacent to the walls they reduce tree and knob formation as well.

In the second instance carbon monoxide may be used as the purge gas. This gas not only acts in the manner of an inert gas, repelling preformed particles of titanium dioxide from the walls and thus preventing plating by its normal sweeping action, but also has the capacity of chemically preventing any excess titanium tetrachloride present from reacting on the walls of the combustion chamber, suppressing the formation of trees and knobs. Chemically, carbon monoxide produces two effects. First, it reacts with any free oxygen adjacent to the surface of the combustion zone, reducing this oxygen to carbon dioxide with which the titanium tetrachloride cannot combine. The second effect of carbon monoxide is to favor the reaction of the chlorine gas present with any titanium dioxide which may have plated or formed on the walls. By this reaction titanium tetrachloride is regenerated, which then may react in the normal manner to form pigmentary titanium dioxide or be discharged from the chamber unoxidized. Thus, carbon monoxide not only acts directly to retard the development of a plating, but also is effective in establishing conditions unfavorable for the formation and existence of trees and knobs.

In the third instance may be used hydrogen, ammonia, water vapor, nitrogen oxides, hydrocarbon gases, and other gases which yield water on combustion. These gases, while effective in retarding plating, act in known manner to affect the particle size of the titanium dioxide produced.

In the fourth instance oxygen may be used, and this gas is most advantageously employed when the amount of oxygen otherwise admitted is greater than the stoichiometrical based upon the flow of titanium tetrachloride into the combustion zone. In addition, titanium tetrachloride, silicon tetrachloride, aluminum trichloride and similar metal chlorides may also be employed, particularly when an excess of titanium tetrachloride is present in the combustion zone.

Mixtures of the gases recited above may also be employed, including producer gas and water gas, and further suitable gases will occur to those skilled in the art. Such gases are included within the present invention.

In the cooling zone, any of the foregoing may be used as the purge gas. Ordinarily, of course, from the point of view of operating efficiency it will be advantageous to select a gas which will not react exothermically with any of the constituents of the gaseous suspension.

In normal practice, where the stream of reaction gases contains oxygen and titanium tetrachloride in substantially equimolecular proportions it is preferred to employ nitrogen, oxygen, titanium tetrachloride, chlorine or particularly carbon monoxide as the purge gases, these gases being normally cheap and readily available, easily recoverable, and yielding excellent results. They are particularly beneficial in that they do not adversely affect the quality of the pigment produced. They are therefore preferred both with respect to the combustion zone and the cooling zone.

The process of the present invention includes the step of passing the purge gas through the walls of the combustion zone alone; through the walls of the cooling zones alone; and through the walls of both zones simultaneously. The process further includes the steps of passing one gas or gaseous mixture through the walls of the combustion zone and a different gas or gaseous mixture through the walls of the cooling zone. It is preferred, for reasons stated, to pass carbon monoxide through the walls of the combustion zone and chlorine through the walls of the cooling zone.

The minimum rate of flow of purge gas respectively needed through the walls of the combustion zone and the cooling zone to prevent plating can best be found by experiment, as the tendency of particles to plate depends on a combination of many factors, including their crystal habit and shape, their size, their adhesiveness, the speed and turbulence of their flow, and the temperature of the zones. Cessation of plating and tree and knob formation demonstrates that a sufficient rate of flow of purge gas has been attained for the purposes of the present invention. However, a smaller rate of flow yields valuable results, particularly where auxiliary means for reducing plating are employed. In general, as little as 0.1 cubic foot of inert purge gas (N. T. P.) or less flowing through the walls of the combustion zone per square foot of porous walls surface per minute effects a noticeable reduction in the rate of plating, so that there appears to be no minimum rate of flow which will not effect some improvement. At the other extreme, plating is almost always substantially prevented when the flow of inert gas is increased to about 1 to 2 cu. ft. (N. T. P.) per minute per square foot of wall surface.

The material used for construction of the porous walls plays no part in the present invention, and suitable materials will be evident to those skilled in the art. Among these are sintered silicon carbide, alundum (fused aluminum oxide), and unglazed fired kaolin. Alundum is preferred because of its ready availability, the ease with which it can be machined and cemented to form the necessary shapes, its high mechanical strength, its low coefficient of expansion, and its resistance to thermal shock.

It is necessary only that the pore size of the porous refractory be such that a sufficient volume of purge gas, as indicated below, can be permeated through the walls without the use of sufficient pressure to cause the apparatus to leak unduly or to collapse. Substantially the same results are obtained when high purge gas pressure is used to force a given mass of purge gas through fine pores as when a low pressure is used to force the same volume of purge gas through large pores. Preferably the pore size and thickness of the refractory will be correlated so that a suitable mass of purge gas can be diffused therethrough by the use of a moderate pressure differential, for example, 0.1 to 5 pounds per square inch, and excellent results have been obtained with porous alundum of ¼ to ½" wall thickness having an apparent specific gravity of 2.3, alundum of this porosity passing an ample supply of the gas at pressures of a fraction of a pound per square inch. The size of the pores may be larger than 1 mm. in diameter, but a much smaller size is preferred because of better structural strength and more uniform gas distribution.

Ordinarily, for simplicity of construction, the thickness of the refractory will be uniform throughout the apparatus. It should be noted that the viscosity of every gas increases with an increase in its temperature, and this effect, if not compensated for by a decreased wall thickness at the point of intense heat, reduces the flow of purge gas. As a result, where a series of independent jackets are not used, provided with independent supply of purge gas, the refractory should be thinnest or its pore size greatest at the place where it is subjected to the highest temperatures.

Figure 2:
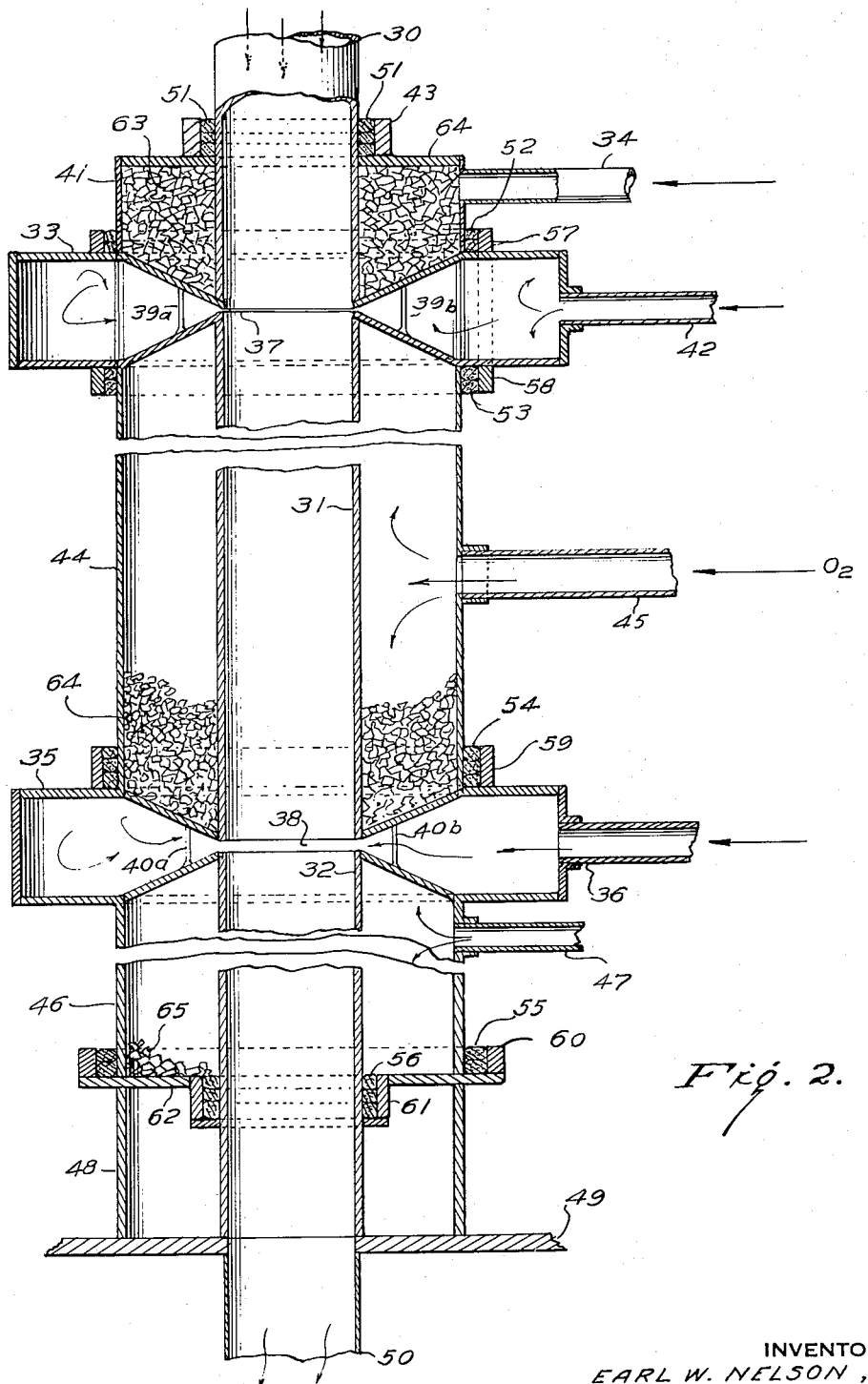

The design of the combustion chamber and associated components and the manner in which titanium dioxide is formed by intersection of the gases play no part in the present invention, but as an aid to its understanding the invention will be more particularly illustrated with reference to the drawings, in which:

Fig. 1 is a vertical section of one form of apparatus for producing titanium dioxide from titanium tetrachloride and oxygen in conjunction with auxiliary gases such as carbon monoxide, oxygen, and nitrogen, while preventing plating according to the present invention, and Fig. 2 is a vertical section of another form of apparatus for the same purpose.

The apparatus of Fig. 1 comprises loosely-fitting flanged cylindrical steel jacket 1 supporting threaded gas feed head 2 composed of concentrically disposed titanium tetrachloride-oxygen gas feed pipe 3, carbon monoxide feed pipe 4, and oxygen feed pipe 5 supplied by gas supply lines 6, 7, and 8 as disclosed in Swiss Patent 265,192. A combustion zone is defined by porous alundum cylinder 9 covered by porous alundum disc 10 through which gas feed head 2 projects. Cylinder 9 is supported by porous alundum conical section 11 which in turn is supported by porous alundum gaseous suspension outlet pipe 12 resting on the bottom of aluminum gas manifold 13. Support for the porous alundum components is also provided by alundum granules filling the space between jacket 1 and conical section 11 and the upper part of pipe 12 represented by granules 14 which also serve to insulate jacket 1 from the heat developed in combustion chamber 9. The bottom of jacket 1 is closed by non-porous alundum disc 15 which is clamped to lower flange of jacket 1 by wing nuts 16 on bolts 17. Bolts 16 pass through oversize holes drilled through the flange and the disc to permit thermal expansion and construction of the jackets. The joint is sealed by asbestos gasket 18. Rope asbestos packing 19 prevents flow of gas around pipe 12.

Jacket 1 is provided with pipes 19a, 20, and 21 through which purge gas is admitted into the space surrounding the alundum. Pipe 12 is perforated to admit pipe 22 through which cold gas or volatilizable liquid is passed to permit direct cooling of the gaseous suspension in pipe 12. The lower portion of porous pipe 12 is surrounded by manifold 13 into which purge gas is admitted under slight pressure through pipe 23. The gaseous suspension is conveyed through aluminum pipe 24 for such further cooling and processing as may be desired either directly or through an evacuating fan pump.

The top of cylindrical steel jacket 1 is closed by annular steel disc 25 containing annular cylindrical flange 26 of tapered bore, through which threaded gas feed head 2 passes. The threads of this head engage the threads of sleeve 27 which acts both as a support for the head and a seal preventing escape of gas from the apparatus. The lower point of gas feed head is surrounded by porous alundum cylinder 28 resting on disc 10. Flow of purge gas over the top of cylinder 28 is substantially prevented by asbestos rope packing 29 pressed into the gland formed by cylindrical flange 26 and cylinder 28.

The dimensions of the apparatus of Fig. 1 are not critical and may be varied widely. When the height of the cylindrical steel jacket 1 is about 6 feet and it diameter about 4 feet, the diameter of porous alundum cylinder 9 may be about 3 feet and its height (with conical section 11) may be about 4.5 feet. The length of manifold 13 may be about 5 feet.

Alundum ½" thick having an apparent specific gravity of about 2.3 is a suitable material for use in the fabrication of the above described reactor. The alundum parts may be fabricated in sections and cemented together by the use of alundum cement.

In the typical production of titanium dioxide in the apparatus described, carbon monoxide and oxygen are admitted through lines 7 and 8 respectively and burned to bring the apparatus up to operating temperature and minimize thermal shock. Titanium tetrachloride and oxygen in approximately equimolecular proportions are admitted through pipe 6 in accordance with Swiss Patent 265,192 followed by nitrogen at 400° C. through lines 19a, 20, and 21, and cold chlorine through lines 22 and 23. The flow of cold chlorine through pipe 22 is adjusted so as to cool the gaseous suspension to about 400° C. When the apparatus is constructed of porous alundum refractory as suggested, the gauge pressure of the nitrogen and the chlorine admitted through line 23 as purge gases is about 0.5 lb. per sq. in. This rate of flow of purge gases substantially prevents plating and much reduces development of trees and knobs.

The precise method by which titanium dioxide is formed plays no part in the present invention, and titanium dioxide may be formed in this apparatus by different methods, as is well known in the art.

The apparatus of Figure 2 consists essentially of a cylindrical porous alundum tube divided into sections, one of which acts as a combustion chamber and another as a cooling chamber, each section of which is surrounded by a jacket for delivery of purge gas. The jackets are separated from each other by annular manifolds communicating directly with the chambers.

In Figure 2, porous alundum pipes 30, 31, and 32 respectively constitute the oxygen supply conduit, the combustion chamber and the cooling chamber. Oxygen supply conduit 30 is separated from combustion chamber 31 by circumferential non-porous manifold 33 provided with titanium tetrachloride supply pipe 42 and combustion chamber 31 is separated from cooling chamber 32 by circumferential non-porous manifold 35 provided with chlorine supply pipe 36. The two manifolds have narrow circumferential feed lips 37, 38 and are provided with spacers 39a, 39b, 40a and 40b made of alundum bars to relieve the stresses on lips 37 and 38.

Circumferential jacket 41 of non-porous alundum provided with purge gas supply inlet tube 34 and cylindrical packing flange 43 surrounds oxygen delivery pipe 30, and begins at the furthest point to which the titanium tetrachloride admitted through lips 37 of manifold 33 may eddy backwards.

The combustion zone between manifolds 33 and 35 is similarly surrounded by jacket 44 of non-porous alundum provided with purge gas supply pipe 45. The cooling zone pipe 32 is likewise surrounded by non-porous alundum jacket 46 provided with purge gas supply pipe 47 and is supported by alundum cylinder 48 which rests on aluminum foundation plate 49. Aluminum pipe 50 conveys the cooled reaction products for such further processing as may be desired.

The jacketing is loosely fitted against the manifolds and the sections of oxygen supply, combustion zone, and cooling zone pipes to prevent stresses resulting from thermal expansion and contraction of the apparatus. Escape of the purge gas from the spaces thus formed is prevented by asbestos rope packing 51—56 pressed into the glands formed by alundum flanges 43, 57—61 and by bottom plate 62 made of non-porous alundum.

Alundum granules of about 1/16" size are packed into the spaces between non-porous jackets 41, 44, and 46 and porous inner pipes 30, 31, 32. The granules are represented by granules 63, 64 and 65 and provide both thermal insulation and support while permitting the purge gases admitted through pipes 34, 45 and 47 to circulate freely therethrough. The entire apparatus between glands 43 and 60 is encased in one or more feet of insulating brick to minimize thermal loss. This brick, being conventional, is not shown.

The apparatus of Figure 2 may be constructed throughout of porous and non-porous alundum having a wall thickness of about ¼". The inside diameter of the porous alundum cylinders may be about 2 inches, and the inside diameter of the cylindrical jacketing of non-porous alundum about 4 inches. The aperture of the two circumferential manifold slots 37 and 38 may be about 1/32 inch and the linear distance between the slots about 24 inches. Jackets 41 and 46 should be at least about 6 inches long.

In operation, the apparatus of Figure 2 is slowly preheated by the use of hot oxygen. Titanium tetrachloride vapor preheated to about 900° C. is then passed into manifold 33 through pipe 42 and oxygen in equimolecular proportion preheated to 950° C. or higher is supplied through pipe 30. Nitrogen preheated to 900° C. is supplied to purge gas supply pipes 34 and 45, and the cold chlorine is supplied to manifold supply pipe 36 and purge gas supply pipe 47. The flow of oxygen and titanium tetrachloride passing through pipes 30 and 42 respectively is regulated so that the stream of gas passes through the apparatus at the rate of about 1 meter per second. The purge gases supplied through pipes 34, 45 and 47 are delivered at a gauge pressure of about 0.5 lb./sq. in. The flow of cold chlorine into pipe 36 is regulated so that the temperature of the suspension leaving the cooling zone is below 600° C. and preferably below 400° C. High quality titanium dioxide pigment in gaseous suspension is delivered from pipe 50.

We claim:

1. A process for reducing the tendency of titanium dioxide pigment particles to "plate" in the manufacture of titanium dioxide by reaction of titanium tetrachloride with oxygen in a combustion chamber, which consists in continuously reacting titanium tetrachloride with oxygen at about 900° C. to 1600° C. to form titanium dioxide and chlorine in a combustion chamber having a reaction zone and a cooling zone, at least one of said zones being defined by a porous refractory material, and continuously passing a gas consisting only of carbon monoxide transversely through said porous refractory material into the zone defined by said material while the temperature of the titanium dioxide therein is in excess of about 600° C., the amount of said oxygen admitted with said titanium tetrachloride being slightly in excess of that required for complete combustion of said titanium tetrachloride and said carbon monoxide and any other metal chlorides; whereby any free oxygen adjacent to the inner surface of said porous refractory material is reduced to carbon dioxide with which titanium tetrachloride can not combine and thereby the surface of said refractory is maintained substantially free from titanium dioxide incrustations.

2. A process for reducing the tendency of titanium dioxide pigment particles to "plate" in the manufacture of titanium dioxide by reaction of titanium tetrachloride with oxygen in a combustion chamber, which consists in reacting titanium tetrachloride with oxygen at about 900° C. to 1600° C. to form titanium dioxide and chlorine in a reaction zone defined by a porous refractory material, and passing a gas consisting only of carbon monoxide transversely through said porous refractory material into said zone, the amount of said oxygen admitted with said titanium tetrachloride being slightly in excess of that required for complete combustion of said titanium tetrachloride and said carbon monoxide and any other metal chlorides; whereby any free oxygen adjacent to the inner surface of said porous refractory material is reduced to carbon dioxide with which titanium tetrachloride can not combine and thereby the surface of said refractory is maintained substantially free from titanium dioxide incrustations.

3. A process according to claim 2 wherein the rate of flow of gas through the porous refractory is equal to between about 0.1 cu. ft. and 2.0 cu. ft. of gas per minute at normal temperature and pressure per square foot of porous refractory surface.

4. A process for reducing the tendency of titanium dioxide pigment particles to "plate" in the manufacture of titanium dioxide by reaction of titanium tetrachloride with oxygen in a combustion chamber, which consists in reacting titanium tetrachloride with oxygen at about 900° C. to 1600° C. to form titanium dioxide and chlorine in apparatus having a cooling zone defined by a porous refractory material wherein said titanium tetrachloride is cooled to at least 600° C. and passing a gas consisting only of carbon monoxide transversely through said porous refractory material into said cooling zone while the temperature of the titanium dioxide therein is in excess of about 600° C., the amount of said oxygen admitted with said titanium tetrachloride being slightly in excess of that required for complete combustion of said titanium tetrachloride and said carbon monoxide and any other metal chlorides; whereby any free oxygen adjacent to the inner surface of said porous refractory material is reduced to carbon dioxide with which titanium tetrachloride can not combine and thereby the surface of said refractory is maintained substantially free from titanium dioxide incrustations.

References Cited in the file of this patent
UNITED STATES PATENTS

| | | |
|---|---|---|
| 1,881,041 | Benjamin | Oct. 4, 1932 |
| 1,967,235 | Ferkel | July 24, 1934 |
| 2,062,358 | Frolich | Dec. 1, 1936 |
| 2,670,272 | Nutting | Feb. 23, 1954 |
| 2,670,275 | Olson | Feb. 23, 1954 |